(No Model.) 4 Sheets—Sheet 1.
E. BACKUS.
MECHANISM FOR OPERATING BRAKES.
No. 415,338. Patented Nov. 19, 1889.
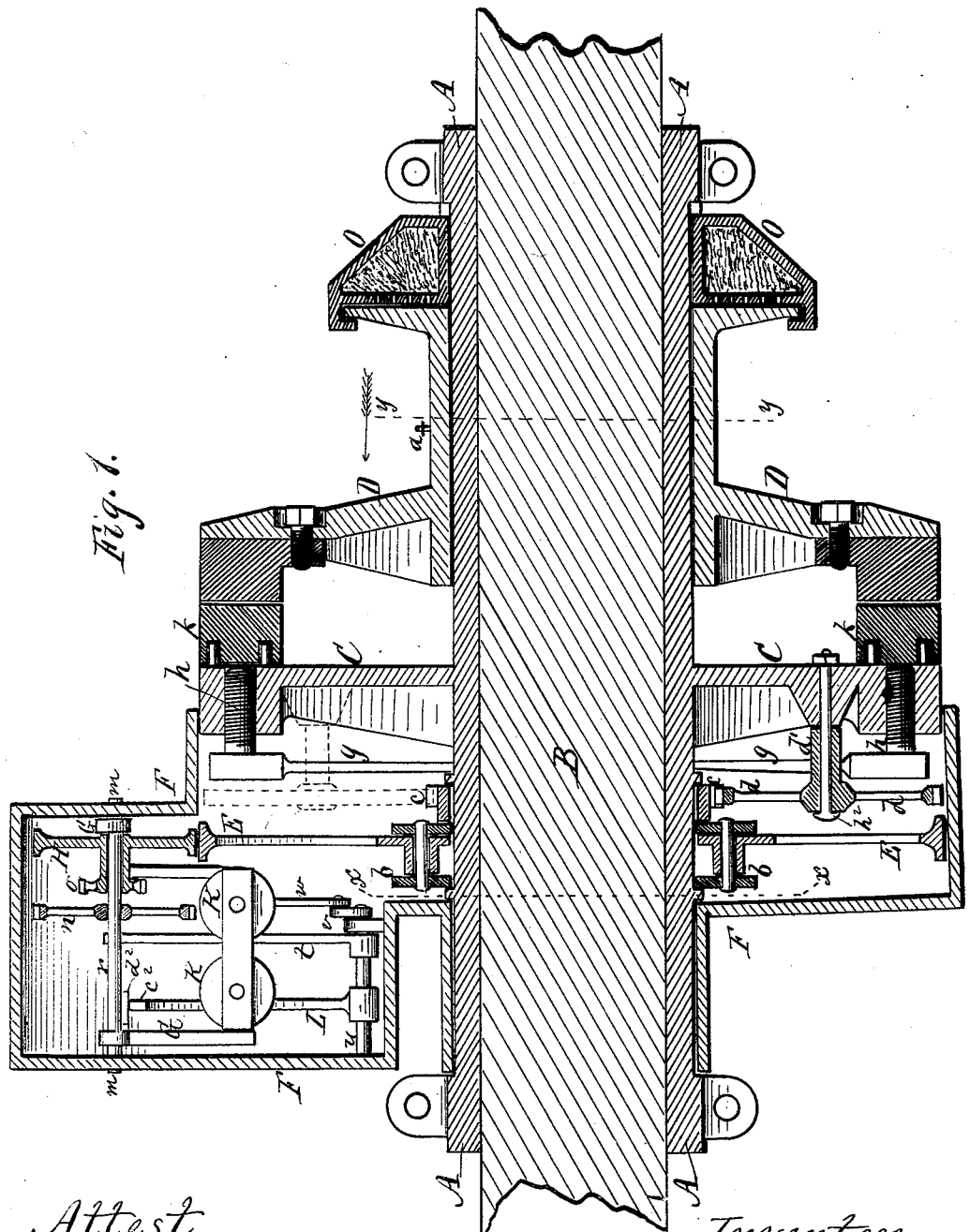
Attest.
K. F. Osgood
P. H. Costich
Inventor:
Edward Backus (No Model.) 4 Sheets—Sheet 2.
E. BACKUS.
MECHANISM FOR OPERATING BRAKES.
No. 415,338. Patented Nov. 19, 1889.
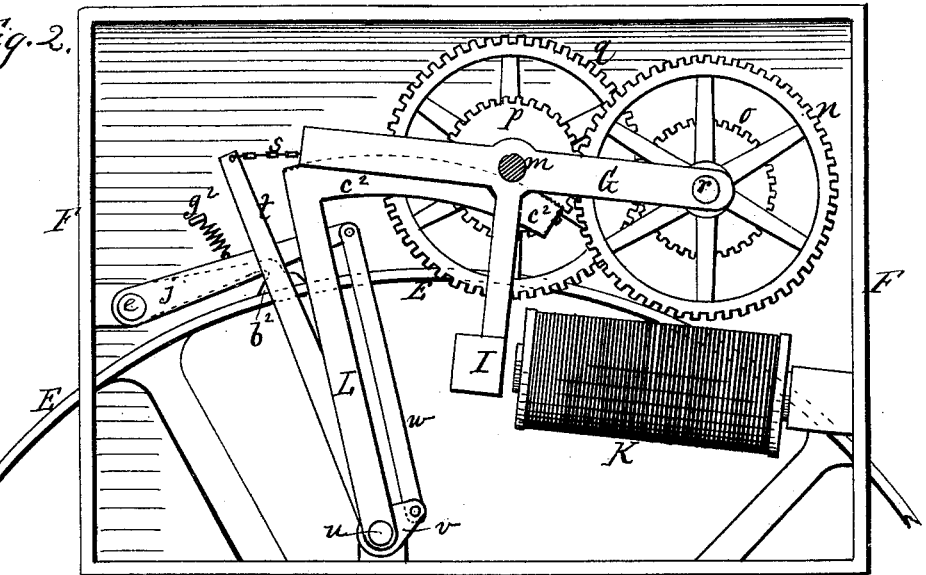
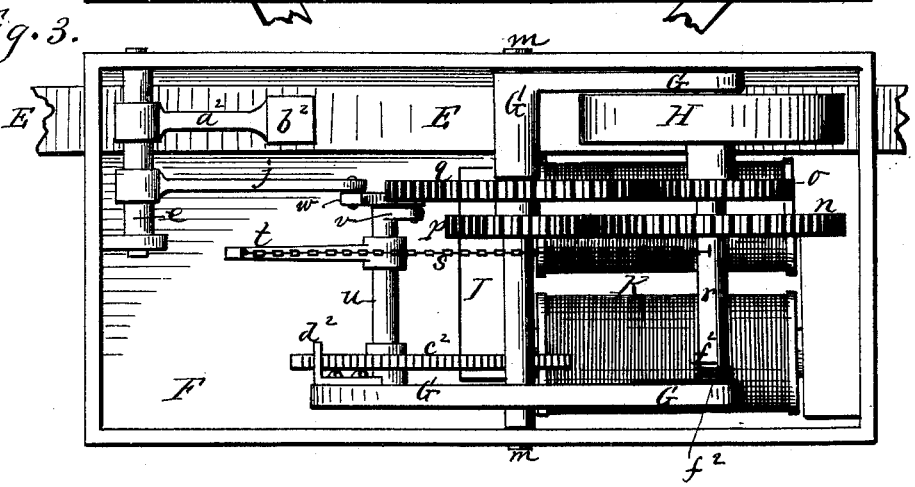
Attest
R. F. Osgood
P. H. Costich
Inventor.
Edward Backus
N. PETERS, Photo-Lithographer, Washington, D. C.

(No Model.) 4 Sheets—Sheet 3.

E. BACKUS.
MECHANISM FOR OPERATING BRAKES.

No. 415,338. Patented Nov. 19, 1889.

Attest.
R. F. Osgood
P. A. Costich

Inventor.
Edward Backus (No Model.) 4 Sheets—Sheet 4.
E. BACKUS.
MECHANISM FOR OPERATING BRAKES.
No. 415,338. Patented Nov. 19, 1889.
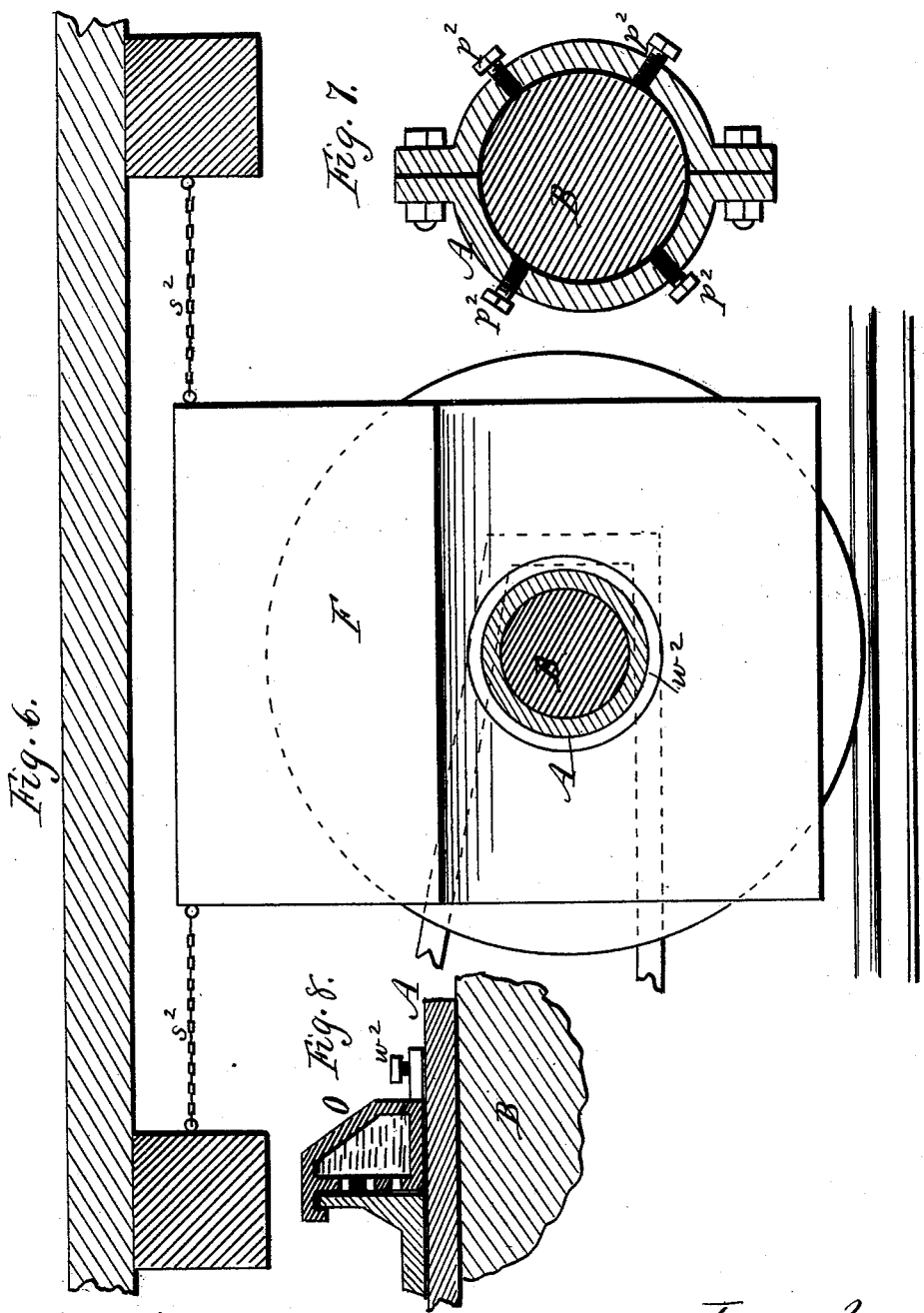
Attest.
R. H. Kratich
C. H. Hurst
Inventor.
Edward Backus
per R. F. Osgood,
Atty.

UNITED STATES PATENT OFFICE.

EDWARD BACKUS, OF ROCHESTER, NEW YORK.

MECHANISM FOR OPERATING BRAKES.

SPECIFICATION forming part of Letters Patent No. 415,338, dated November 19, 1889.

Application filed February 3, 1888. Serial No. 262,874. (No model.)

*To all whom it may concern:*

Be it known that I, EDWARD BACKUS, of Rochester, in the county of Monroe and State of New York, have invented a certain new and useful Improvement in Mechanism for Operating Brakes; and I do hereby declare that the following is a full, clear, and exact description of the same, reference being had to the drawings accompanying this application.

My invention relates to improvements in car-brakes in which the momentum of the car is used to operate the brake and electricity is used to connect and disconnect the brake mechanism.

The objects of the invention are, first, to provide a brake that can be operated instantly on all of the cars at once from either end of the train, and, second, to provide a brake that will act automatically if the train is separated. I attain these objects by the mechanism illustrated in the accompanying drawings, in which—

Figure 4:
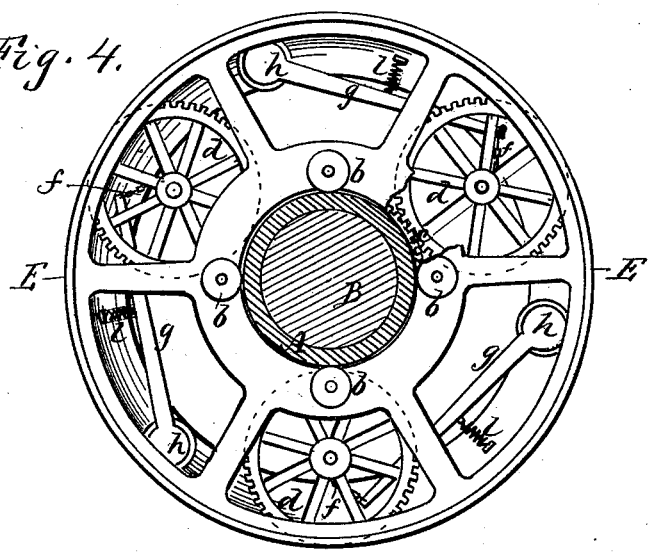
Figure 5:
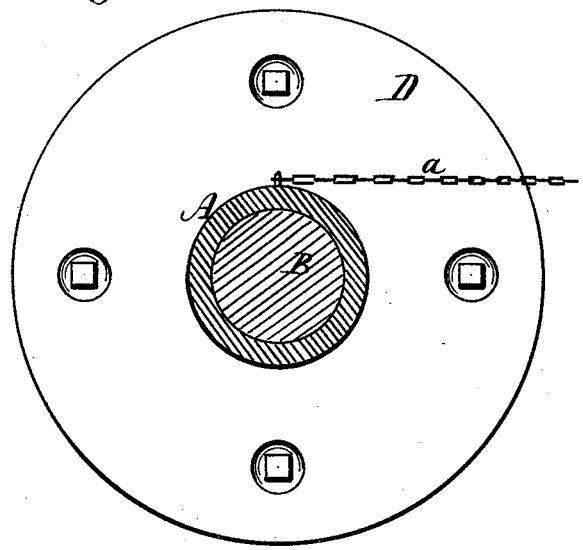

Figure 1 is a vertical section in line with the axle. Fig. 2 is a side elevation of the mechanism operated by electricity for starting and stopping the brake. Fig. 3 is a top plan view of the same. Fig. 4 is a cross-section in line $x\ x$ of Fig. 1. Fig. 5 is a cross-section in line $y\ y$ of Fig. 1, showing the chain that connects with and draws on the brake-beam of the car. Fig. 6 is a section of a portion of the car-bottom, a cross-section of the axle, and an elevation of the attachment connected therewith. Fig. 7 is a cross-section of the axle and sleeve, showing the method of connecting the same. Fig. 8 is a detail view showing a section of a portion of the axle and the hollow collar connected therewith.

A is a sleeve that surrounds the axle B of a car, and is fastened thereto by set-screws $P^2\ P^2$ or other suitable means.

C is a wheel rigidly attached to the sleeve, and revolves with it and the axle. D is a wheel that is loose on this sleeve, and is connected with the ordinary brake-bar of the car by a chain $a$, one end of which is fastened to the hub of the wheel and the other to the brake-beam. It is obvious that if the faces of these two wheels C D are forcibly brought in contact while wheel C is revolving it will tend to revolve wheel D and pull on chain $a$ and press the brake-shoes against the car-wheels. This is accomplished by the following mechanism: On sleeve A is placed a friction-wheel E, supported by rollers $b\ b$, so as to revolve free on said sleeve. It carries a gear $c$, which drives three planetary gear-wheels $d\ d\ d$. These three gear-wheels have their bearings on studs $h^2$ of the wheel C. Connected with the hub $d'$ of each of these gear-wheels $d$ is one end of a chain $f$, the other end being attached to a crank-arm $g$ of a screw $h$, that screws through the wheel C, for a purpose presently to be described. It is now evident that if a resistance is applied against the periphery of wheel E while it is revolving with sleeve A and wheel C said wheel E will be retarded and will cause the three planetary gears $d\ d\ d$ to revolve as they are carried around by wheel C, and will cause the chains $f f$ to wind up on the hubs of the wheels $d\ d\ d$, and will draw the crank-arms $g\ g\ g$ toward the hubs, which in turn will turn the screws $h\ h\ h$ and press on the friction-shoe $k$, attached to the face of wheel C, and force it outward. The shoe $k$ is free to move out and in on dowels, as shown in Fig. 1, or in some equivalent manner. This shoe, when pressed out by the screws, bears against the loose wheel D and gives motion to same and causes it to wind up the chain $a$.

O is a collar, cast hollow and filled with lubricating material, which collar, by bearing against wheel D, keeps it in place. It is fastened to the sleeve by set-screws $w^2$, so that it can be adjusted forward as the friction-face of wheel D wears away. When the resistance is removed from the periphery of wheel E, springs $l\ l$, attached to cranks $g\ g$, will cause the gear-wheels $d\ d\ d$ to turn back and assume their original position, at the same time turning back the screws $h\ h\ h$ and relieving the brake-shoe $k$.

The balance of the mechanism is for the purpose of enabling a person to apply the resistance to wheel E at a distance by electricity, and is constructed and operated as follows:

F is a case that has a hollow hub that fits loosely on sleeve A, and is prevented from displacement by suitable connections to the truck or car-body, preferably a chain or chains $s^2 s^2$. This case forms a cover and a support to the works inside. G is a rocking frame, that vibrates on journals $m\ m$ and carries a friction-roller H and two sets of double gears $n\ o\ p\ q$, gear $n$ being fastened to a shaft $r$ of the rocking frame, and all of the other gears being loose and turning freely on their shafts. Frame G extends below and supports an armature I, which rests opposite the poles of an electro-magnet K.

The operation is as follows: The circuit being open, the armature leaves the magnet and the frame G falls by gravitation and brings the roller H in contact with the friction-wheel E. By this means roller H receives motion and revolves shaft $r$ through the medium of the gears $n\ o\ p\ q$. As the shaft $r$ revolves it winds up a chain $s$, attached thereto at one end and to a lever $t$ at the other, said lever being attached to a rock-shaft $u$, having a crank $v$. As the chain winds up it draws on lever $t$ and operates crank $v$. $w$ is a connecting-rod pivoted at one end to crank $v$ and at the other to an arm $j$, attached to a rock-shaft $e$. At the end of rock-shaft $e$ is an arm $a^2$, with a friction-pad $b^2$, which rests over the wheel E and forms the resistance thereto when pressed down. When the circuit is closed again, the armature is drawn back, the friction-wheel H raised, and all the parts resume their former position.

The above description applies to an emergency brake, or one that is used at its maximum strength. When used for a service-brake, or where only a portion of its power is used, the following additions have to be made, viz: On rock-shaft $u$ and firmly attached thereto is an arm L, that carries at its top a quadrant $c^2$, which is notched on its upper side. Frame G is extended from the fulcrum $m$ to a point near the quadrant, and is provided with a dog $d^2$, that projects over the quadrant and engages with the notches therein when the frame is vibrated by the magnet. Attached to shaft $r$ is one end of a torsion-spring $f^2$, the other end being attached to the end of frame G.

The operation is as follows: The circuit being open, the roller H revolves by reason of bearing on friction-wheel E, and winds chain $s$ on shaft $r$, thereby drawing quadrant $c^2$ forward by reason of its attachment to rock-shaft $u$, and causing the friction-pad $b^2$ to be pressed upon wheel E. When the friction-pad $b^2$ has pressed hard enough on wheel E to produce the required pull on brake-chain $a$, the operator closes the circuit, which brings the dog $d^2$ down into the notches of the quadrant $c^2$ and holds the brake-pad on the wheel E as long as the circuit is closed. In other words, the dog locks the quadrant in place, thereby holding the friction-pad down. In the meantime the chain $s$ has unwound from shaft $r$ by reason of the reaction of the torsion-spring $f^2$. To release the brake again it is only necessary to break the circuit for an instant, when the dog $d^2$ will be lifted from the quadrant and the quadrant will instantly fly back and take up the slack in chain $s$, previously mentioned as having been unwound from shaft $r$ by reason of the torsion-spring. This reaction of the quadrant is produced by a spring $g^2$, attached to the arm of the friction-pad $b^2$.

It will be observed that, although the friction-roller H must of necessity be down when the dog is up to release the quadrant $c^2$, in consequence of the chain being slack, the shortness of time that it is down to allow the quadrant to retract it has no appreciable effect on the latter in going back.

In this invention it will be noticed that the brake is operated by forcing the friction-shoe $k$ forward against the face of wheel D. This requires but a very slight movement, and a partial turn of the screws $h\ h\ h$ is sufficient for the purpose. But little power is required to turn these screws; hence the electric mechanism shown and described is sufficient for the purpose. While very little power is required to operate the screws to force the friction-shoe $k$ out, the grinding of the friction-faces together has great power to operate the brake on the car.

This mechanism, instead of being used on a sleeve covering the axle, may be used directly on the axle, if desired, or on a separate shaft driven from the axle.

Having described my invention, what I claim as new, and desire to secure by Letters Patent, is—

1. In a mechanism for operating brakes, the combination, with the axle, of a wheel fixed to the same and revolving with it, a wheel resting loosely thereon, so as to turn independently, and provided with a chain that extends to the brake-bar, and a friction-shoe attached loosely to the face of the fixed wheel, so as to be adjusted outward to come in contact with the face of the movable wheel, as shown and described, and for the purpose specified.

2. The combination, with the axle, of a wheel fixed to same and revolving with it, a wheel resting loosely thereon, so as to turn independently, and provided with a chain that extends to the brake-bar, a friction-shoe attached to the face of the fixed wheel so as to move out and in, and screws attached to the fixed wheel resting against the friction-shoe for forcing the same outward, as herein shown and described.

3. The combination, with the axle, of a fixed wheel attached thereto, a loose wheel mounted thereon provided with a winding chain, a friction-shoe on the fixed wheel movable out and in, screws attached to the fixed wheel bearing against the friction-shoe to operate the same, levers attached to the screws, chains attached to the levers, and winding-wheels on the hubs of which the chains wind to operate the screws, as herein shown and described.

4. The combination, with the fixed wheel attached to the axle and provided with a movable friction-shoe, of screws passing through the wheel bearing against the shoe, levers attached to the screws, chains attached to the levers, planetary gears mounted on studs of the fixed wheel, on the hubs of which the chains wind, and a friction-wheel mounted loosely on the axle, provided with a gear with which the planetary gears engage, whereby when a retarding force is applied to the friction-wheel the screws will be operated to force the friction-shoe outward, as herein shown and described.

5. The combination of the friction-wheel E, mounted loosely on the axle, the electro-magnet K, armature I, the friction-pad $b^2$, resting over the friction-wheel, and mechanism between the armature and friction-pad for operating the latter when the circuit is open, as and for the purpose specified.

6. The combination, with the friction-wheel E, of the electro-magnet K, the armature I, and the rocking frame G, carrying the roller H, which is brought into contact with the friction-wheel on an open circuit, as herein shown and described.

7. The combination, with the friction-wheel E, of the electro-magnet K, the armature I, the rocking frame G, the roller H, and the gearing on the rocking frame, arranged to operate in the manner and for the purpose specified.

8. The combination, with the friction-wheel E, of the electro-magnet K, the armature I, the rocking frame G, the roller H, the chain $s$, attached to shaft $i$ of the roller and winding on same, the lever $t$, and its rock-shaft $u$, whereby when the roller is brought in contact with the friction-wheel the chain will be wound up to operate the rock-shaft, as and for the purpose specified.

9. The combination of the lever $t$, the rock-shaft $u$, the crank $v$, the connecting-rod $w$, arm $j$, rock-shaft $e$, and friction-pad $b^2$, as shown and described, and for the purpose specified.

10. The combination of the electro-magnet K, the armature I, the rocking frame G, the dog $d^2$, attached to the rocking frame, and the notched quadrant $c^2$, attached to a lever, with which quadrant the dog engages, as shown and described, and for the purpose specified.

11. In a brake mechanism, the combination, with a driving-wheel fixed to the axle and provided with a friction-shoe movable in and out, of an electro-magnet, an armature, a friction-wheel resting loosely around the axle, a friction device resting over the friction-wheel for producing friction to retard the wheel, said friction device being operated by the magnet, and mechanism connecting the friction-wheel with the friction-shoe on the driving-wheel, whereby when the friction-wheel is retarded the shoe will be forced outward, as and for the purpose specified.

In witness whereof I have hereunto signed my name in the presence of two subscribing witnesses.

EDWARD BACKUS.

Witnesses:
R. F. OSGOOD,
P. A. COSTICH.